May 26, 1953  W. RICHMOND  2,639,613
SPRING AND WEIGHT TESTING DEVICE
Filed Jan. 10, 1947

INVENTOR.
WALTER RICHMOND
BY
Oberlin & Limbach
ATTORNEYS

Patented May 26, 1953

2,639,613

UNITED STATES PATENT OFFICE 2,639,613

SPRING AND WEIGHT TESTING DEVICE

Walter Richmond, Cleveland, Ohio, assignor to Accurate Parts Manufacturing Company, Cleveland, Ohio, a corporation of Ohio Application January 10, 1947, Serial No. 721,217

5 Claims. (Cl. 73—161)

The present invention relates to a weighing and testing device, and one which is also suited to the determination of the "weight" or compressive strength of coil springs such as are used in automotive vehicle clutches or valves of internal combustion engines. The device embodying my invention is of the hydraulic fluid type, wherein the weight or pressure exerted and to be determined is imposed upon a confined body of fluid such as oil; and the resultant pressure indicated by means of a fluid pressure gauge connected to such body.

It is the general object and nature of my invention to provide a method and means for weighing and testing, wherein the number of component parts is reduced to a minimum, the structure rendered durable and proof against inadvertent damage and careless handling; wherein precision machining of parts, close fits and the like are not necessary; in summary, a device that can be conveniently assembled and economically manufactured; and at the same time will stand up and retain its accuracy under the conditions of shop use.

In general, the device of my invention comprises a collapsible-wall bellows, the top wall of which serves the dual function of a weighing platform and a closure wall for the bellows, and whose bottom wall likewise serves the dual function of the bottom closure wall for the bellows and a mounting base; such bellows structure in turn being enclosed in a protective and surrounding base housing. The device also includes a pressure indicating gauge having a bimetallic strip pointer which automatically compensates for variations in atmospheric temperature conditions, and a connecting conduit leading to the interior of the bellows through the plate member forming the combined mounting base and supporting wall of the bellows.

Additional objects and advantages of my invention will become apparent as the following description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
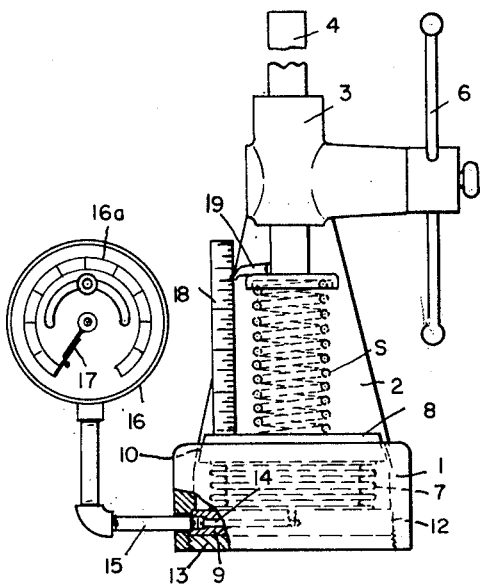
Fig. 1 is a front elevational view of a device embodying the principle of my invention showing it adapted for the testing of the pressure and deflection of a coil spring.

Referring more particularly to the drawing, there is shown therein a base frame comprising the annular shaped housing portion 1 to which is joined an upright column 2 of T-shaped cross-section, with the latter in turn supporting a cylindrical portion 3 in which the rack arbor 4 is adapted to be reciprocated. A pinion gear 5 engages with the gear rack of the arbor 4 and is operated by means of the hand lever 6.

In vertical alignment with and beneath the end of the arbor 4, there is a collapsible bellows 7 whose top and bottom walls are formed by the circular plates 8 and 9, respectively. The flexible walls of the bellows 7 are joined to the plates 8 and 9 in a liquid tight joint, such as indicated at A, as by means of welding, brazing or being cast, one part into the other.

The upper plate 8 has a peripheral side which is in the form of a conical surface, indicated at 10, which is in turn normally slightly spaced from the complementary, interior conical surface 11 in the base portion 1. This slight clearance space between the surfaces 10 and 11 (on the order of .005 of an inch) permits the upper plate 8, forming the top wall of the bellows 7 and the platform upon which the spring S or similar article is to be weighed or tested, to move sideways only a slight amount before it is supported by contact with the inner surface 11 of the base portion 1. At the same time, such clearance prevents the upper plate 8, when in its normally unloaded position, from being wedged against the base frame 1, and thus interfering with the accurate operation of the device. Furthermore, since the surfaces 10 and 11 are complementary conical surfaces, they will form a progressively larger clearance space between each other as the plate 8 is depressed or moved downwardly; thus the possibility of sliding contact friction between these parts is eliminated, and accurate operation of the weighing and testing device preserved.

The lower plate 9 fits against a shoulder 12 in the base portion 1 and is held in assembled position by means of the threaded cap plate 13. A bored passage 14 leads from the center of the plate 9 and the interior of the bellows 7, to the outer periphery of such plate where it is tapped for connection to the pipe or tube 15 leading to the indicating gauge 16, which is of pressure-gauge type suitably calibrated to the purpose in view.

The indicating gauge 16 has its indicating needle or pointer in the form of a bimetallic strip 17. This bimetallic strip is so constructed as to warp or bend in a plane parallel with the dial 16a of the gauge, to give a slightly different reading at its outer end, dependent upon atmospheric temperature conditions, and thus to compensate for the effect of such temperature conditions upon the body of oil or to the fluid contained within the bellows 7. Also as shown in Fig. 1, the dial 16a is circularly adjustable within limits so as to take care of barometric and temperature changes, and variations in the character of the springs being tested, and to adjust for variations in the effective area of bellows used. For instance thus, in testing weights or the compressive pressure of a spring the dial may be first set to subtract out the existent atmospheric or barometric pressure and so read direct to the test result sought.

A scale bar 18 stands vertically erect on the top of the plate 3 and to one side of the vertical center line of the arbor 4. A pointer 19 is carried by the arbor 4 and overlies the scale 18, whereby the amount of deflection of the spring S may be measured upon the scale 18 for a given compressive pressure exerted upon the spring.

Figure 2:
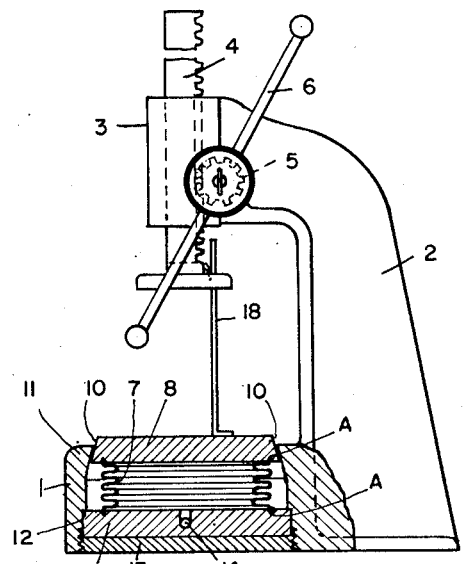
Fig. 2 is a side elevational view partially in section of the device in Fig. 1.
Figure 3:
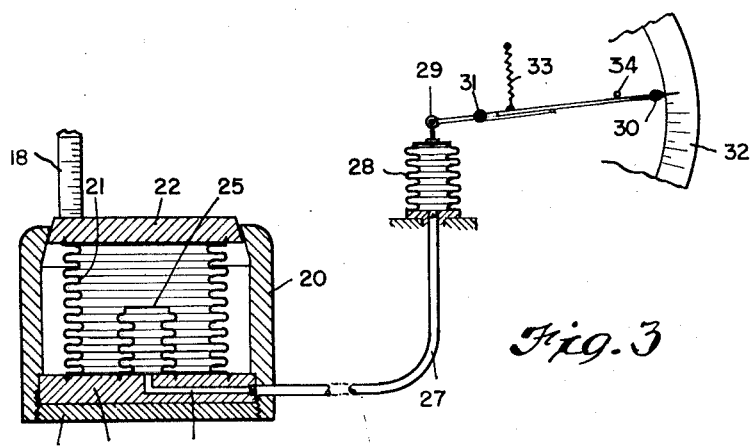
Fig. 3 is a view more or less diagrammatic in character illustrating a modified form of the device.

In the modified form of the invention shown in Fig. 3, provision is made in a different way from that described above and automatically takes care of changes in barometric pressure by transmitting the compression of the fluid medium through an auxiliary bellows to operate the pressure indicating gauge. Thus, an enclosing base or housing portion 20 surrounds the collapsible bellows 21 whose upper and lower ends are closed by the top plate 22 and the bottom plate 23, respectively. These parts are mounted in the base 20 in the same manner as previously described in connection with Figs. 1 and 2, viz., by means of the threaded cap plate 24. A smaller and closed end bellows 25 is mounted within the bellows 21 and has its lower end sealed to the bottom plate 23. The space defined by the bellows 21 and 25 is filled with a fluid medium such as oil. The bellows 25 in turn, together with its connecting parts, is filled with a suitable fluid. The bore 26 leads from the interior of the bellows 25 to the exterior of the bottom plate 23 where it is connected through the tube 27 to a second bellows 28, and the closed top end of the bellows 28 is pivotally connected as indicated at 29 to one end of the indicating pointer 30 which is mounted upon the fixed pivot 31 and adapted to move across the arcuate scale 32. A return spring 33 is connected to the pointer 30 and normally tends to pull it against the stop pin 34. This pointer, it will be noted, is of the same bimetallic construction as pointer 17 to compensate for temperature changes.

Thus, as weight or pressure other than barometric is exerted upon the top plate 22 of the device shown in Fig. 3, the compressive pressure upon the fluid within the bellows 21 in turn tends to compress the bellows 25 and the fluid contained within the latter. The pressure upon the fluid in the bellows 25 is correspondingly transmitted through the tube 27 to the bellows 28 to expand the latter and thus move the bimetallic indicating arm 30 downwardly on the scale 32. Since the bellows 25 and 28 are of the same effective area, barometric pressure tending to collapse bellows 28 will exactly balance barometric pressure tending to collapse bellows 21, therefore changes in barometric pressure are taken care of automatically instead of manually as in Fig. 1 and they will not be indicated on the scale 32.

Figure 4:
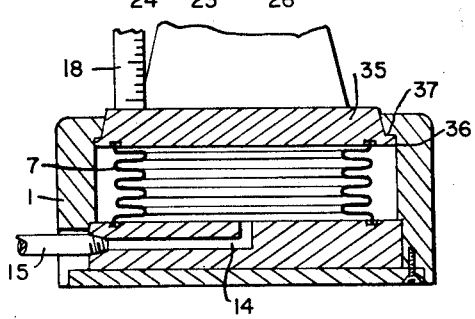
Fig. 4 is a sectional view generally corresponding with that of Fig. 2, but showing another modification in construction.

The modification illustrated in Fig. 4 relates to the construction of the base of the device in which the flexible bellows is housed.

Thus in Fig. 4 such base with appurtenant parts which otherwise are of substantially the same construction as that shown in Figs. 1 and 2, differ in that the upper circular plate 35 is provided with a laterally projecting flange 36 about its lower edge and the side wall of the base portion projects inwardly to form a complementary shoulder 37, thus providing a definite stop which limits upward movement of the plate within the base portion.

It will be understood that in the modifications, when they are used for spring testing, suitable means for pressing the spring to be tested against the top plate will be utilized and an indicating gauge will be connected with the interior of the collapsible bellows either as shown in Fig. 1 or in Fig. 3.

In taking the weights of articles, the article to be tested is placed on the platform of the device, and the pointer position on the calibrated dial is read. With the Fig. 3 form of the device the reading is direct, with automatic elimination of effect of atmospheric pressure on the platform. With the Fig. 1 form the dial may be first set to eliminate the atmospheric pressure value and then the reading is direct. Thus articles may be conveniently and quickly weighed, or a series of articles may be tested for variation from a desired standard, etc. Again in testing and rating springs, the pressure reading on the dial, in the Fig. 3 form is direct and automatically compensated for atmospheric pressure, or in the Fig. 1 form is compensated by allowance at the dial. Springs may thus be tested for their individual space compression rating, or a series of springs may be tested for variation from a desired standard, etc. For example, for some purposes the springs may be compressed by the arbor 4 to a standard height on the scale 18 and the pressure transmitted may be read on the gauge 16; or, otherwise the springs may be compressed to some standard point on the gauge 16 and the resultant height be read on the scale 18. Springs may be very quickly and accurately classified and rated, or supposedly uniform springs can be very quickly checked to throw out off-standard units.

Other modes of applying the principle of the invention may be employed, change being made as regards the details described, provided the features stated in any of the following claims or the equivalent of such be employed.

I therefore particularly point out and distinctly claim as my invention:

1. In a device of the character described, a base frame, a fluid-filled bellows supported thereby, said bellows including a corrugated tubular member having top and bottom closure plates for the ends thereof, the top plate being adapted to serve as a weighing platform and the lower plate as a support for the bellows, said frame surrounding said bellows and having an inwardly-directed stop margin to limit movement of the said upper plate, there being a conduit in said lower plate leading from the outside thereof to the interior of said bellows, and an indicating gauge connected to said conduit.

2. In a device of the character described, a base frame, a fluid filled bellows including an upper plate forming the top wall of said bellows adapted to serve as the weighing platform and a lower plate mounted in said frame and forming the bottom wall of said bellows, said frame surrounding said bellows and said upper plate, a stop for said upper plate including an interior conical surface on said frame adjacent said upper plate, and the latter having an exterior conical surface on its periphery and normally spaced a slight distance from said interior conical surface on said frame, there being a conduit in said lower plate leading from the outside thereof to the interior of said bellows, and an indicating gauge connected to said conduit.

3. In a device of the character described, a base frame, a bellows including a corrugated tubular member having top and bottom closure plates for the ends thereof, the top plate providing a platform and the lower plate a support for the bellows and being mounted in said frame, said frame surrounding the bellows and its upper plate and having inwardly-directed stop means to limit movement of said upper plate, there being a conduit in the lower plate leading from the outside thereof to the interior of the bellows, and an indicating gauge connected to said conduit.

4. In a device of the character described, a base frame comprising a lower annular housing portion and an upper arbor-mounting portion, an arbor in said latter portion movable in a vertical plane, fluid-filled means providing a cooperating yieldable platform in relation to said arbor including a bellows with a corrugated tubular member having top and bottom closure plates for the ends thereof, said top plate forming the top wall and the lower plate forming the bottom wall of the bellows, stop means overhanging the top plate to limit movement thereof, a conduit in the lower plate connecting from the outside to the interior of the bellows, and an indicating gauge connected to said conduit.

5. In a device of the character described, a base frame comprising a lower annular housing portion and an upper arbor-mounting portion, an arbor in said latter portion movable in a vertical plane, and fluid-filled means providing a cooperating yieldable platform in relation to the arbor including a bellows with a corrugated tubular member having top and bottom closure plates for the ends thereof, said top plate forming the top wall and the lower plate forming the bottom wall of the bellows, means for indicating the pressure on said bellows for a given position of said arbor, and means eliminating error in such indicated pressure by complications of atmospheric pressure variations, said means including a smaller auxiliary bellows within the aforesaid bellows, a conduit leading from said smaller bellows, a pressure-indicating gauge connected to said conduit, and a pointer operated by said gauge.

WALTER RICHMOND.

References Cited in the file of this patent

UNITED STATES PATENTS

| Number | Name | Date |
|---|---|---|
| 873,034 | Ely | Dec. 10, 1907 |
| 1,136,633 | Watres | Apr. 20, 1915 |
| 1,165,934 | Amthor | Dec. 28, 1915 |
| 1,204,483 | Pilling | Nov. 14, 1916 |
| 1,222,315 | Manning | Apr. 10, 1917 |
| 1,259,680 | Theobald | Mar. 19, 1918 |
| 1,446,439 | Lieberman | Feb. 20, 1923 |
| 1,817,315 | Knapp | Aug. 4, 1931 |
| 1,822,587 | Essen | Sept. 8, 1931 |
| 1,874,780 | McGuckin | Aug. 30, 1932 |
| 2,125,483 | Blanchard | Aug. 2, 1938 |
| 2,265,043 | Pfeiffer | Dec. 2, 1941 |
| 2,353,155 | Hall | July 11, 1944 |
| 2,359,236 | Moore | Sept. 26, 1944 |

FOREIGN PATENTS

| Number | Country | Date |
|---|---|---|
| 26,809 | Great Britain | 1897 |
| 10,485 | Great Britain | 1904 |
| 131,145 | Switzerland | Jan. 31, 1929 |
| 766,324 | France | Apr. 9, 1934 |